Dec. 8, 1959  A. W. DASCHKE  2,916,700
FREQUENCY-RESPONSIVE DEVICE
Filed July 18, 1955
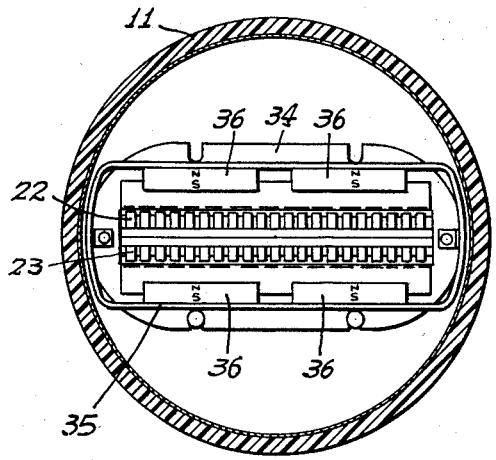
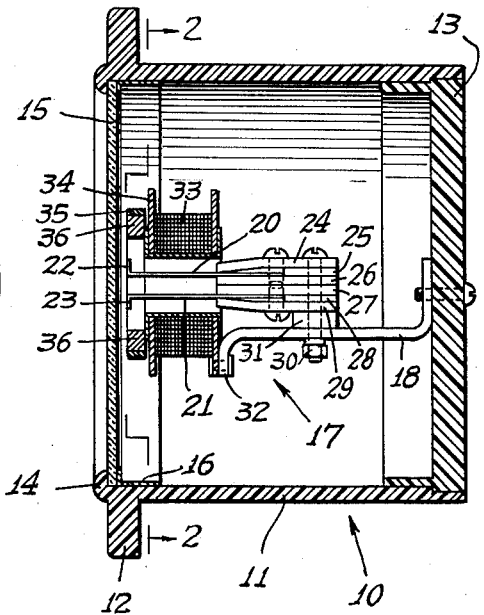
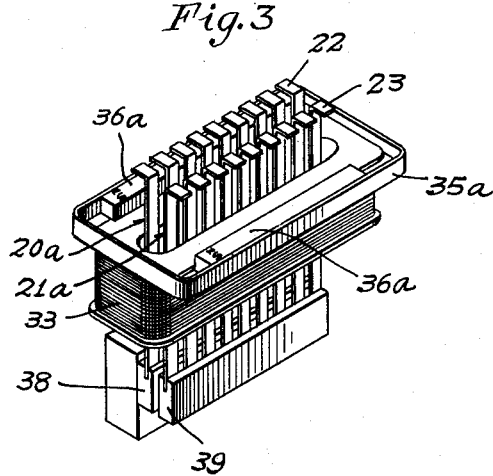
INVENTOR.
Arthur W. Daschke
BY
Herbert G. Lehmann
AGENT

United States Patent Office 2,916,700
Patented Dec. 8, 1959

2,916,700

FREQUENCY-RESPONSIVE DEVICE

Arthur W. Daschke, Morristown, N.J., assignor to J-B-T Instruments, Inc., New Haven, Conn., a corporation of Connecticut Application July 18, 1955, Serial No. 522,494

4 Claims. (Cl. 324—80)

This invention relates to electrical, frequency-responsive devices, and more particularly devices of this type which employ vibratile elements or reeds.

The invention is illustrated and described herein as applied to a vibrating reed type of frequency meter; however, it should be understood that the present specific disclosure and description are for illustrative purposes only and are not to be considered in a restrictive sense, since the scope of the invention is more properly defined in the appended claims.

An object of the invention is to provide a novel and improved vibrating-reed type of frequency-responsive device wherein a larger and more easily seen visual indication is had of the frequency of the applied voltage.

Another object of the invention is to provide a novel and improved vibrating-reed frequency meter, wherein multiple vibrating members or flags are provided for each frequency indication to produce the effect of a very wide amplitude of vibration.

A further object of the invention is to provide an improved vibrating-reed frequency meter in accordance with the above, wherein the effect of a large amplitude of vibration is had without burdening any one reed with a large flag area or the like.

A still further object of the invention is to provide an improved frequency meter of the above type, wherein the effect of a large amplitude of vibration is obtained with but a relatively small input.

A feature of the invention resides in the provision of an improved vibrating-reed frequency meter wherein the efficiency of the driving coil is improved, thereby reducing losses and effecting a greater output for a given input.

Another object of the invention is to provide an improved frequency-responsive device in accordance with any of the above, which is relatively simple in construction and economical to fabricate, and is extremely reliable in use throughout an extended period.

Other features and advantages will hereinafter appear.

In the drawing accompanying this specification, similar characters of reference indicate corresponding parts in the several views, in which:

Fig. 1 is an axial sectional view of an improved frequency-responsive device in the form of a meter, made in accordance with the invention.

Fig. 2 is a transverse sectional view taken on line 2—2 of Fig. 1.

Fig. 3 is a perspective view of a meter movement per se, made in accordance with a modification of the invention.

Referring to Figs. 1 and 2 there is shown a conventional type of casing 10 formed of a cylindrical body 11 having at its forward edge a mounting flange 12 and at its rear a transverse wall 13, which latter is preferably made to be removable from the body 11. Adjacent the flange 12 is a circular frontal bead 14 retaining a transparent window 15 which may be held in place by the usual retainer ring 16.

Within the casing 10 there is provided, in accordance with the present invention, a novel and improved electro-responsive device in the form of a vibrating-reed frequency meter movement 17, said movements being mounted by means of brackets 18 on the rear transverse wall 13 of the casing. The meter movement 17 comprises two sets of vibratile reeds 20 and 21 arranged with graduated periods of vibration. As shown in Fig. 2, each set comprises 21 reeds symmetrically arranged to constitute 21 opposed pairs, and I form the reeds so that those of any pair have exactly the same vibratory period. The reeds of the sets 20, 21 may be formed in any suitable manner, and are shown as being made of flat thin strips of magnetic material, having their foremost ends turned outwardly from each other in opposite directions and constituting flags 22 and 23.

The rearmost ends of the reeds are mounted by being secured to clamping means comprising strips 24, 25, 26, 27, 28 and 29 disposed in a pile-up assemblage, said assemblage being attached by means of bolts 30 to the mounting brackets 18, with a spacer strip 31 disposed between.

The brackets 18 have down-turned foremost ends 32, to which there is secured an exciting or driving coil 33, the latter being preferably wound on a bobbin 34. Attached to the front of the bobbin 34 is an elongate, somewhat rectangular frame 35 to which are secured a number of bar magnets 36, here shown as four in number. As indicated in Fig. 2, the bar magnets 36 are transversely magnetized and arranged so that dissimilar poles face each other and are disposed on opposite sides of the rows of reeds 20, 21.

By the above organization there is induced in the reeds, 20, 21 fluxes which may be thought of as being of opposite sense or direction. For example, assuming that flux emanates from a north pole, the induced flux in the row of reeds 21 will be upward in the flags 23 and in part to the right as viewed in Fig. 1, while the flux in the row 20 will be in part to the left and then upward in the flags 22. These induced fluxes are hereinafter referred to as being opposite in direction since they present opposite polarities exteriorly and interiorly of the rows 20, 21 of the reeds.

I have found that with the above structure, whenever a periodically fluctuating voltage is impressed on the driving coil 33 with a frequency corresponding to the period of one of the pairs of reeds, it will cause opposite vibrations of said reeds, providing the effect of a wide amplitude of movement of the flags. Each flag of the pair of reeds which is vibrating will travel in a predetermined path adjacent that of the other flag, and the result will be a combined indication of both flags, providing a large and easily seen visual indication to be had. It will be understood that the 21 pairs of reeds may be graduated to provide an indication of 21 different frequencies, preferably all within a relatively narrow band.

A modified form of the invention is shown in Fig. 3, wherein similar parts or components have been given like characters wherever possible.

In Fig. 3 the mounting of the reeds is different from that of Fig. 1. Two mounting strips 38 and 39 are shown in Fig. 3, having imbedded in them the bases of the reeds, said reeds being disposed in sets or rows 20a and 21a having nine reeds each.

A rectangular frame 35a is provided, carried by the driving coil 33 and mounting a single pair of transversely-magnetized bar magnets 36a (as distinguished from the four bar magnets shown in Fig. 2). Operation of the instrument movement shown in Fig. 3 is similar in principle to the movement first described above.

It will be seen that by the present invention I have provided a simple and economical-to-manufacture, improved frequency-responsive device in the form of a vibrating-reed frequency meter wherein an enlarged and improved visual indication is had of the frequency of the energy applied to the driving coil. By virtue of the increased amount of iron or magnetic material within the coil 33 the efficiency of the latter is improved, reducing its losses and providing a greater output amplitude of the reeds for a given input energy. Moreover, the inclusion of the additional iron in the core of the coil is not at the expense of desirable mechanical constants of the reeds.

The adjacent paths of travel of the flags 22 and 23 are so arranged that when the reeds of any given pair vibrate oppositely in response to the coil being energized with their particular frequency it will appear very much like the vibration of a single member, of relatively large area.

As at present understood, vibration of a lower reed 21 in response to an impressed frequency in the coil 33 will impart vibratory forces to the reed mount comprising the strips 24, 25, 26, 27, 28 and 29, and these forces, having the same period as the associated upper reed 20, will tend to react on the uper reed. The vibratory movement of the said upper reed 20 in response to the impressed frequency in the coil will in turn impart vibratory forces to the reed mount which will react with the forces impressed thereon by the lower reed 21, and in consequence there may be augmented the vibration of the reeds. It is believed that this phenomenon produces a greater stability of the reed mount, due to the reactive forces on the mount being in opposition because of the opposite movements of the reeds. Where greater stability of the reed mount is attained, the accuracy of the individual periods of the reeds as they were initially calibrated is maintained, thereby providing a more precise instrument movement of maximum response characteristic.

While the invention is illustrated herein as embodied in a frequency meter, it will be readily understood that the principle is applicable to various types of frequency-responsive devices having vibratile components.

Variations and modifications may be made within the scope and the claims and portions of the improvements may be used without others.

I claim:

1. A frequency meter comprising an assemblage of two sets of vibratile reeds disposed in adjacent rows, the reeds of each set being graduated in period and matched to corresponding reeds of the other set, all of said reeds including magnetic armatures and having flags disposed in a field of vision; means including permanent bar magnets disposed on opposite sides of said assemblage of reeds, with proximal poles of the magnets being unlike and facing the reeds, for producing opposite magnetic fluxes in said armatures; means for driving said reeds, comprising a driving coil, said coil surrounding the armatures and being disposed adjacent each one of said armatures, and being adapted to provide a fluctuating reactive field about the same of a given frequency to be measured, said field causing simultaneous opposite movements of the reeds of one matched pair whereby the flags of the reeds will provide a doubly-large indication, the remote poles of said bar magnets facing away from the reeds; and a continuous loop of magnetic material surrounding the bar magnets and engaged with the said remote poles thereof to provide a flux-confining low-reluctance return path for flux produced by the magnets and to minimize external stray magnetic fields, said loop confining that leakage flux of the magnets, which is located substantially in the plane containing the magnets, to an area within a distinctly and sharply defined zone in said plane.

2. The invention as defined in claim 1 in which the means producing opposite magnetic fluxes includes a plurality of narrow, elongate, transversely magnetized bar magnets disposed on each side of the assemblage of reeds, said bar magnets extending for an appreciable distance along the said continuous loop.

3. A frequency meter comprising an assemblage of at least one set of vibratile reeds disposed in a row, said reeds including magnetic armatures and having flags disposed in a field of vision; means including permanent bar magnets disposed on opposite sides of said assemblage of reeds with the proximal poles of the magnets being unlike and facing the reeds, for producing opposite magnetic fluxes in said armatures; means for driving said reeds, comprising a driving coil, said coil surrounding the said armatures and being disposed adjacent each one of said armatures, and being adapted to provide a fluctuating reactive field about the armatures, of a given frequency to be measured, said field causing movement of that one of the reeds having a resonant frequency which is the same as the frequency of said field, the remote poles of said bar magnets facing away from the reeds; and a continuous loop of magnetic material surrounding the bar magnets and engaged with the said remote poles thereof to provide a flux-confining low-reluctance return path for flux produced by the magnets and to minimize external stray magnetic fields, said loop confining that leakage flux of the magnets, which is located substantially in the plane containing the magnets, to an area within a distinctly and sharply defined zone in said plane.

4. The invention as defined in claim 3, in which the loop comprises a thin metal strip having flat inside surfaces, and in which the means producing opposite magnetic fluxes includes a plurality of narrow, elongate, transversely magnetized bar magnets disposed on each side of the row of reeds, said bar magnets extending for an appreciable distance along the inside of said continuous loop and having their remote poles in intimate engagement with the inside surfaces of the loop.

References Cited in the file of this patent

UNITED STATES PATENTS

| 996,713 | Hartmann-Kempf | July 4, 1911 |
| 2,681,588 | Dyner | June 22, 1954 |

FOREIGN PATENTS

| 167,494 | Germany | June 25, 1905 |
| 23,317 | Great Britain | Feb. 20, 1908 |
| 212,532 | Germany | Aug. 4, 1909 |
| 56,115 | Austria | Nov. 11, 1912 |
| 868,470 | Germany | Feb. 26, 1953 |
| 868,635 | Germany | Feb. 26, 1953 |

OTHER REFERENCES

"A New Idea in Vibrating Reed Frequency Meters," article published by J-B-T Instruments Inc. New Haven, Conn., in Bulletin VF–43, VF–43–1a, and VF–43–1b, copyrighted 1943.